United States Patent
Maeda et al.

(10) Patent No.: US 12,130,706 B2
(45) Date of Patent: Oct. 29, 2024

(54) REDUNDANCY REDUCTION IN BLOCKCHAINS

(71) Applicant: International Business Machines Corporation, Armonk, NY (US)

(72) Inventors: Kumiko Maeda, Tokyo (JP); Munetaka Ohtani, Fujisawa (JP); Yutaka Oishi, Kanagawa-ken (JP); Chikafumi Yasumoto, Tokyo (JP); Jiayun Zhu, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 460 days.

(21) Appl. No.: 15/841,607

(22) Filed: Dec. 14, 2017

(65) Prior Publication Data
US 2019/0188086 A1 Jun. 20, 2019

(51) Int. Cl.
*G06F 11/14* (2006.01)
*G06F 16/23* (2019.01)
(Continued)

(52) U.S. Cl.
CPC ...... *G06F 11/1453* (2013.01); *G06F 11/1464* (2013.01); *G06F 16/2365* (2019.01); *G06F 16/2379* (2019.01); *G06F 16/27* (2019.01); *H04L 9/0637* (2013.01); *H04L 9/0643* (2013.01); *G06F 16/9014* (2019.01); *G06F 2201/84* (2013.01)

(58) Field of Classification Search
CPC ............. G06F 11/1453; G06F 16/2379; G06F 16/2365; G06F 16/27; G06F 11/1464; G06F 16/9014; G06F 2201/84; H04L 9/0637; H04L 9/0643; H04L 9/3239; H04L 2209/38
See application file for complete search history.

(56) References Cited

U.S. PATENT DOCUMENTS 9,569,771 B2 2/2017 Lesavich et al.
11,108,547 B2 * 8/2021 Yang ..................... H04L 9/3239
(Continued)

OTHER PUBLICATIONS

Plansky, J. et al., "A Strategist's Guide to Blockchain," [online] Strategy+business, © 2017 PwC, Spring 2016, No. 82, Jan. 11, 2016, retrieved from the Internet: <https://www.strategy-business.com/article/A-Strategists-Guide-to-Blockchain?gko=0d586>, 13 pg.

(Continued)

*Primary Examiner* — Mariela Reyes
*Assistant Examiner* — Fernando M Mari Valcarcel
(74) *Attorney, Agent, or Firm* — CUENOT, FORSYTHE & KIM, LLC (57) ABSTRACT

Creation of a new block for a blockchain can be initiated. The new block can include a plurality of transactions. The blockchain can include a plurality of existing blocks. Transaction storage data can be generated for the new block. The transaction storage data can indicate the plurality of transactions and specify, for each of the plurality of transactions, which of a plurality of computing nodes are to keep the transaction in the new block. The generated transaction storage data can be added to the new block. The new block can be communicated to the plurality of computing nodes.

20 Claims, 8 Drawing Sheets

(51) Int. Cl.
*G06F 16/27* (2019.01)
*G06F 16/901* (2019.01)
*H04L 9/06* (2006.01)

(56) References Cited

U.S. PATENT DOCUMENTS

| | | | |
|---|---|---|---|
| 2008/0140667 A1* | 6/2008 | LaBiche | G06Q 30/06 |
| 2014/0280398 A1* | 9/2014 | Smith | H04L 69/326 |
| | | | 707/825 |
| 2016/0261690 A1 | 9/2016 | Ford | |
| 2017/0005804 A1* | 1/2017 | Zinder | H04L 9/3247 |
| 2017/0053249 A1* | 2/2017 | Tunnell | G09C 5/00 |
| 2017/0116693 A1 | 4/2017 | Rae et al. | |
| 2017/0177855 A1* | 6/2017 | Costa Faidella | H04L 9/3236 |
| 2017/0180469 A1 | 6/2017 | Ford et al. | |
| 2017/0235754 A1* | 8/2017 | Zhong | G06F 11/1456 |
| | | | 707/649 |
| 2017/0236120 A1* | 8/2017 | Herlihy | H04L 9/3236 |
| | | | 705/67 |
| 2017/0344435 A1* | 11/2017 | Davis | G06F 16/9014 |
| 2017/0344580 A1* | 11/2017 | King | G06F 16/137 |
| 2017/0344987 A1* | 11/2017 | Davis | G06Q 20/10 |
| 2017/0346693 A1* | 11/2017 | Dix | H04L 41/0803 |

OTHER PUBLICATIONS

"Knapsack Problem", [online] Wikipedia, the free encyclopedia, Nov. 5, 2017, retrieved from the Internet: <https://en.wikipedia.org/wiki/Knapsack_problem>, 12 pg.

Nakamoto, S., "Bitcoin: A Peer-to-Peer Electronic Cash System," [online] http://bitcoin.org/bitcoin.pdf>, 2008, 9 Pg.

Benscha, "How to Solve the Increasing Size-Problem of the Block Chain?" [online] Payment21, Bitcoin, © 2017 Payment21® All rights reserved, Apr. 19, 2016, <https://payment21.com/print/278>, 4 pg.

* cited by examiner

Communicate an opt out request to opt out of a blockchain group to an opt out server
802

↓

Receive a list of target computing nodes from the opt out server
804

↓

Communicate, to each of the target computing nodes, each of the transactions stored in the blockchain maintained by the computing node for the blockchain group
806

↓

Delete the blockchain
808

Receive an opt out request from a computing node requesting to opt out of a blockchain group
902

↓

Identify other computing nodes that are members of the blockchain group
904

↓

Create a target computing node list indicating the other computing nodes that are members of the blockchain group
906

↓

Communicate the list to the computing node from which the opt out request is received
908

↓

Remove the computing node from which the opt out request is received from a computing node list for the blockchain group
910

↓

Communicate to the other computing nodes that are members of the blockchain group an indication that the computing node from which the opt out request is received is no longer a member of the blockchain group
912

REDUNDANCY REDUCTION IN BLOCKCHAINS

BACKGROUND

The present invention relates to distributed computing, and more specifically, to blockchains.

A blockchain is a continuously growing list of records, called blocks, which are linked together and secured using cryptography. Each block typically contains a hash pointer as a link to a previous block, a timestamp and transaction data. A blockchain can serve as distributed ledger than can efficiently record transactions in a verifiable way. For use as a distributed ledger, a blockchain typically is managed by a peer-to-peer network collectively adhering to a protocol for validating blocks. Blockchains are considered very secure, making them suitable for a variety of record keeping activities.

SUMMARY

A method includes initiating creation of a new block for a blockchain. The new block can include a plurality of transactions. The blockchain can include a plurality of existing blocks. The method also can include generating, using a processor, transaction storage data for the new block. The transaction storage data can indicate the plurality of transactions and specify, for each of the plurality of transactions, which of a plurality of computing nodes are to keep the transaction in the new block. The method also can include adding the generated transaction storage data to the new block. The method also can include communicating the new block to the plurality of computing nodes.

A system includes a processor programmed to initiate executable operations. The executable operations include initiating creation of a new block for a blockchain. The new block can include a plurality of transactions. The blockchain can include a plurality of existing blocks. The executable operations also can include generating transaction storage data for the new block. The transaction storage data can indicate the plurality of transactions and specify, for each of the plurality of transactions, which of a plurality of computing nodes are to keep the transaction in the new block. The executable operations also can include adding the generated transaction storage data to the new block. The executable operations also can include communicating the new block to the plurality of computing nodes.

A computer program includes a computer readable storage medium having program code stored thereon. The program code is executable by a processor to perform a method. The method includes initiating, by the processor, creation of a new block for a blockchain. The new block can include a plurality of transactions. The blockchain can include a plurality of existing blocks. The method also can include generating, by the processor, transaction storage data for the new block. The transaction storage data can indicate the plurality of transactions and specify, for each of the plurality of transactions, which of a plurality of computing nodes are to keep the transaction in the new block. The method also can include adding, by the processor, the generated transaction storage data to the new block. The method also can include communicating, by the processor, the new block to the plurality of computing nodes.

DETAILED DESCRIPTION

This disclosure relates to distributed computing, and more specifically, to blockchains. In accordance with the inventive arrangements disclosed herein, in response to a request to create a new block for a blockchain comprising a plurality of existing blocks, a computing node can create a new block, and add the block to a version (or copy) of the blockchain kept by that computing node. The block can include transactions and various other data. When creating the new block, the computing node can add to the block transaction storage data specifying which computing nodes are to keep certain ones of the transactions or particular groups of the transactions. The computing node can communicate the new block to other computing nodes in a same blockchain group as the computing node that created the new block. Being members of the same blockchain group, each of the other computing nodes can keep respective versions (or copies) of the blockchain.

Each computing node receiving the new block can identify the transaction storage data in the new block and, from the transaction storage data, determine which transactions it is to keep. The computing node receiving the new block can selectively remove (e.g., delete) from its respective copy of the new block the transactions that it is not specified to keep. Each computing node can add its respective copy of the new block, having a portion of the transactions removed, to its respective version of the blockchain.

The transactions which are kept in the new block can vary from computing node to computing node, but each of the transactions can be kept in a plurality of versions of the new block. Some blockchains may even include a version of the block that includes all of the transactions. Accordingly, if a particular copy of a block or blockchain were to be corrupted, the transactions will not be lost. Nonetheless, by reducing the number of transactions in at least some of the versions of the new block, the storage space used for storing the corresponding blockchains on those computing nodes will be reduced. This storage space saved by only keeping a portion of the transactions can be used to store other data. Moreover, data access times for accessing the transactions will be improved in comparison to a scenario in which all of the transactions were stored in the blockchain, thus improving computing node performance when the transactions are accessed. In this regard, the reading of the transaction data will be more sequential and less random than if all transactions were stored in the blockchain being read. Further, when specifying which computing nodes are to store which transactions, transactions that are related, or closely related, can be stored to the same computing nodes. This can serve to reduce data access times when the transactions accessed from the blockchain since it may not be necessary to access the transactions from multiple versions of the blockchain.

Several definitions that apply throughout this document now will be presented.

As defined herein, the term "transaction" means data stored in a block.

As defined herein, the term "block" means a record that stores one or more transactions, and stores a root hash of a hash tree (e.g., a Merkle tree) of the one or more transactions. A block also may store other data, such as a hash pointer serving as a link to a previous block and a nonce.

As defined herein, the term "blockchain" means a growing list of blocks which are linked to one another and secured using cryptography.

As defined herein, the term "peer-to-peer network" means a distributed application architecture that partitions tasks or workloads between computing nodes, which are peers in the distributed application architecture.

As defined herein, the term "computing node" means a processing system including at least one processor and memory that is a node of a communication network. Examples of a computing node include, but are not limited to, a server, a workstation, a desktop computer, a computer terminal, a mobile computer, a laptop computer, a netbook computer, a tablet computer, a smart phone, and the like. Network infrastructure, such as routers, firewalls, switches, access points, etc., are not computing nodes as the term "computing node" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

Figure 1:
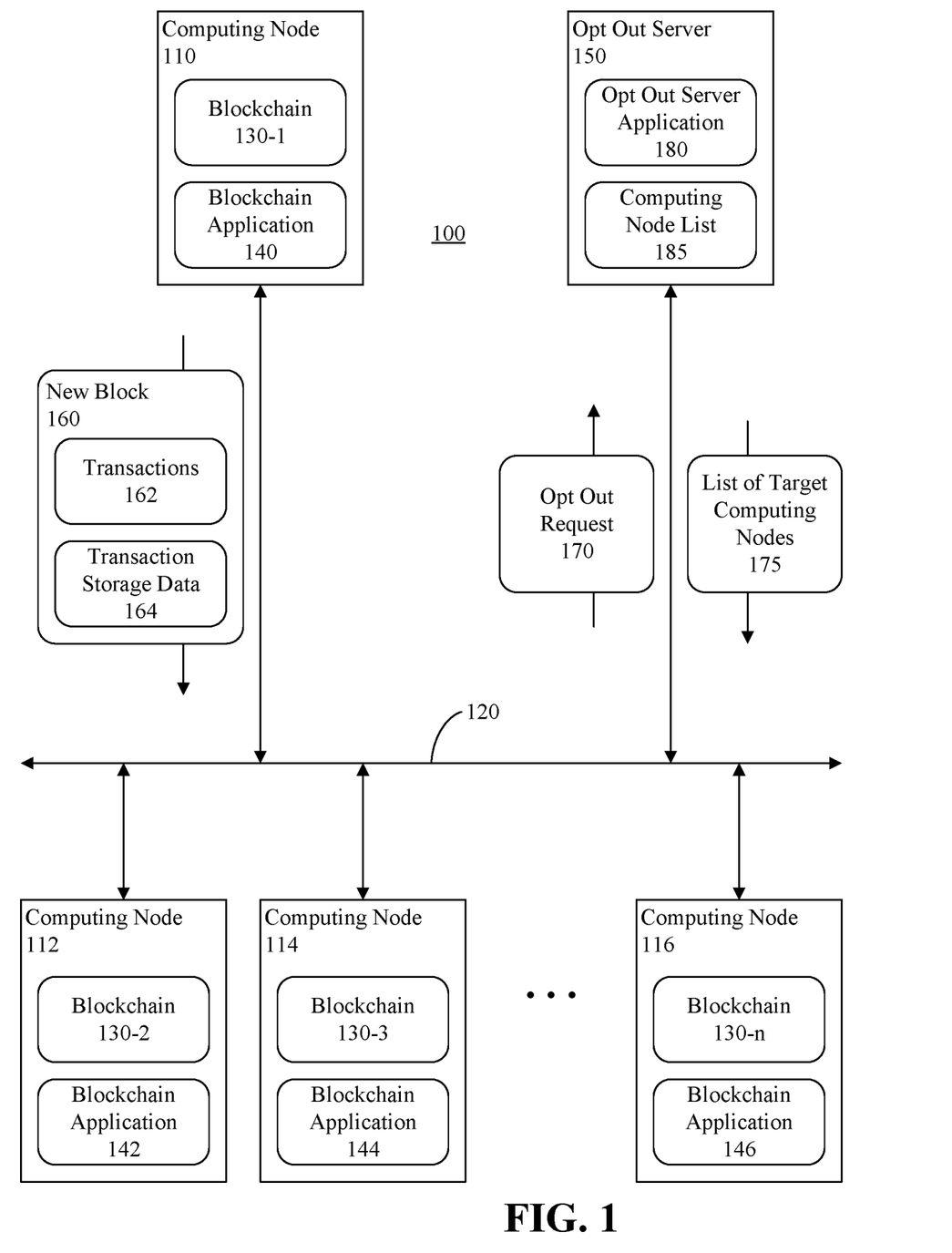
FIG. 1 is a block diagram illustrating an example of a computing environment.

FIG. 1 is a block diagram illustrating an example of a computing environment 100. The computing environment 100 can include a plurality of computing nodes 110, 112, 114, 116. The computing nodes 110-116 can communicatively link to one another in a peer-to-peer network established over a communication network 120. The computing nodes 110-116 can be members of a blockchain group assigned to maintain one or more blockchains, for example a blockchain 130. In this regard, each computing node 110, 112, 114, 116 can maintain a respective version (or copy) 130-1, 130-2, 130-3, 130-n of the blockchain 130. Each computing node 110, 112, 114, 116 can host (i.e., execute) a respective blockchain application 140, 142, 144, 146 configured to maintain the blockchain 130 and perform various processes described herein. Each of the blockchain applications 140-146 can be a respective copy of the same application, though this need not be the case.

The computing environment 100 also can include an opt out server 150. The computing nodes 110-116 may communicatively link to the opt out server 150 via the communication network 120, for example when opting out of a blockchain group.

The communication network 120 is the medium used to provide communications links between various devices and data processing systems connected together within the computing environment 100. The communication network 120 may include connections, such as wire, wireless communication links, or fiber optic cables. The communication network 120 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

Operation of the computing nodes 110-116 in the computing environment 100 is described in greater detail with reference to the following flow charts and diagrams.

Figure 2:
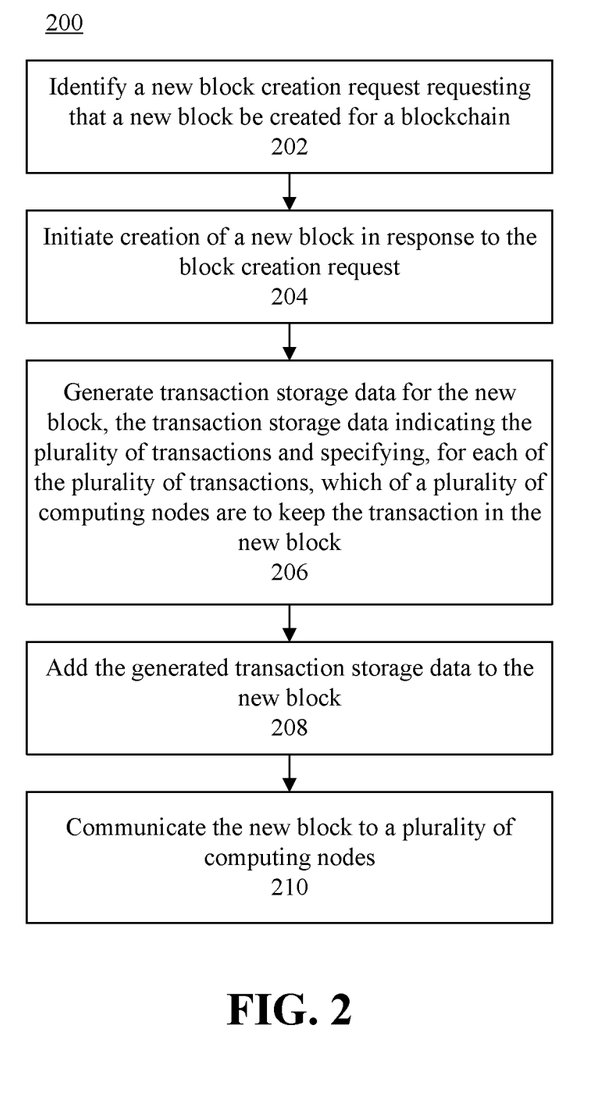
FIG. 2 is a flow chart illustrating an example of a method of creating a block for a blockchain.

FIG. 2 is a flow chart illustrating an example of a method 200 of creating a new block for a blockchain. The method 200 will be described with reference to FIGS. 1 and 2. The method 200 can be implemented by the computing node 110 (e.g., the blockchain application 140).

At step 202 of the method 200, the computing node 110 can identify a new block creation request requesting that a new block be created for the blockchain 130. The new block creation request can include, or otherwise indicate, transactions 162 that are to be included in the new block 160. In one non-limiting arrangement, the computing node 110 can generate the new block creation request, for example in response to receiving one or more transactions 162. The transactions 162 can include any form of binary data, examples of which include, but are not limited to, text, an image, a group of images, etc.

At step 204, responsive to identifying the blockchain request, the computing node 110 can initiate creation of a new block 160 for the blockchain 130. By way of example, the blockchain application 140 can execute program code that defines a basic block structure, which optionally may include using a block template to define the basic block structure.

Figure 3:
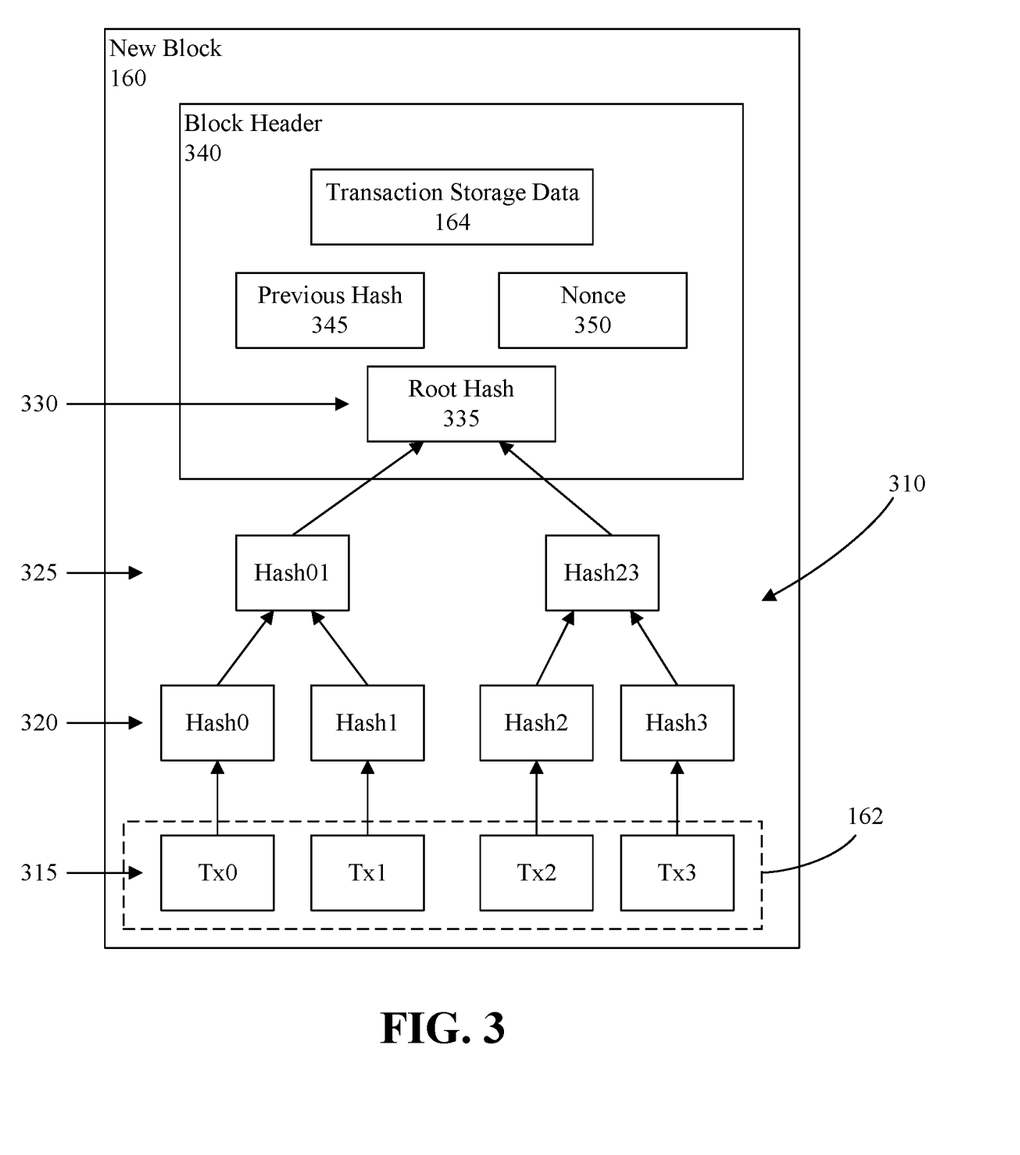
FIG. 3 is a diagram illustrating example structure for a block.

FIG. 3 is a diagram illustrating example structure for the block 160. The blockchain application 140 can add to the block 160 the transactions 162 that are to be included in the new block 160. Further, the blockchain application 140 can hash the transactions 162 into a hash tree 310, for example a Merkle tree. The transactions 162 can be leaf nodes 315 of the hash tree 310, and the hash tree 310 can include non-leaf nodes 320, 325, 330. Each non-leaf node 320, 325, 330 can include a cryptographic hash of its child node(s). In illustration, Hash0 can be a hash of transaction Tx0, Hash1 can be a hash of Tx1, Hash2 can be a hash of Tx2, and Hash3 can be a hash of Tx3. Hash01 can be a hash of Hash0 and Hash1, and Hash23 can be a hash of Hash2 and Hash3. The non-leaf node 330 can be a root has 335, which the blockchain application 140 can add to a block header 340 of the block 160, for example in a root hash field of the block header 340.

The blockchain application 140 also can add to the block header 340 a previous hash 345, which can be a hash of a block in the blockchain 130 (FIG. 1) that the new block 160 is to immediately follow, thus establishing the position of the block 160 in the blockchain 130. The previous hash 345 can be a root hash of the previous block, but this need not be the case. The blockchain application 140 also can add to the block header 340 a nonce 350, which may be used as part of a process for encrypting the block 160. The use of a nonce for encryption is known in the art.

Referring again to FIGS. 1 and 2, at step 206 of the method 200 the computing node 110 can generate transaction storage data 164 for the new block 160. The transaction storage data 164 can indicate the plurality of transactions 162 and specify, for each of the plurality of transactions 162, which of a plurality of computing nodes 110-116 are to keep (e.g., store, persist, etc.) the transaction in the new block 160. The computing nodes 110-116 specified by the transaction storage data 164 can be computing nodes that are members of a blockchain group to which the blockchain 130 is assigned. The computing node 110 can identify the computing nodes 110-116 by accessing a list of computing nodes list indicating that the that computing nodes 110-116 are members of the blockchain group. The computing node 110 can store the list locally or on one or more remote storage devices/systems. As will be described, the computing node 110 can update the list to remove from the list computing nodes that opt out of the blockchain group, and add to the list computing nodes that join of the blockchain group. Thus, the computing node 110 will only specify in transaction storage data for new blocks those computing nodes 110-116 that are current members of the blockchain group to which the blockchain 130 is assigned.

Figure 4:
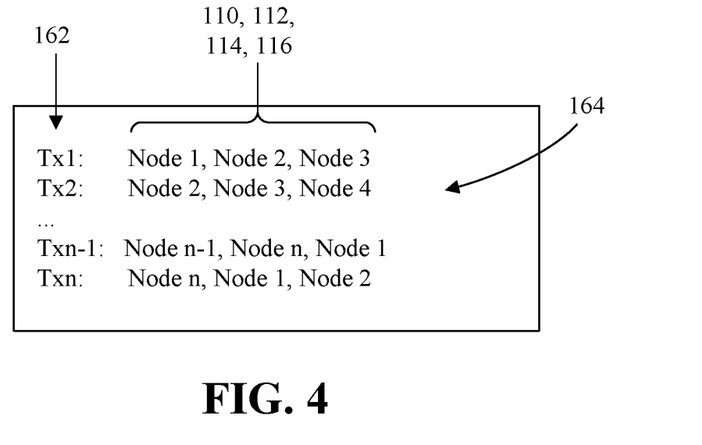
FIG. 4 is a table presenting an example of transaction storage data.

FIG. 4 is a table presenting an example of transaction storage data 164. As noted, the transaction storage data 164 can indicate each of the transactions 162 and, for each transaction 162, specify which computing nodes 110, 112, 114, 116 are to keep that transaction in the respective block 160 to be added to its respective blockchain 130. The computing node 110 can determine which computing nodes 110-116 are to store which transactions 162 in any suitable manner, for example using a round robin approach.

In illustration, the transaction storage data 164 can specify that transaction Tx1 is to be kept by node 1 (e.g., computing node 110), node 2 (e.g., computing node 112) and node 3 (e.g., computing node 114). The transaction storage data 164 can specify that transaction Tx2 is to be kept by node 2 (e.g., computing node 112), node 3 (e.g., computing node 114) and node 4 (not shown in FIG. 1). The transaction storage data 164 can specify that a transaction Txn−1 is to be kept by node n−1 (not shown in FIG. 1), node n (e.g., computing node 116) and node 1 (e.g., computing node 110). Further, the transaction storage data 164 can specify that a transaction Txn is to be kept by node n (e.g., computing node 116), node 1 (e.g., computing node 110), and node 2 (e.g., computing node 112). In one aspect, the transaction storage data 164 can specify that one or more of the computing nodes 110-116 are to keep each of the transactions 162 in the block 160, for example by modifying the round robin approach.

Figure 5:
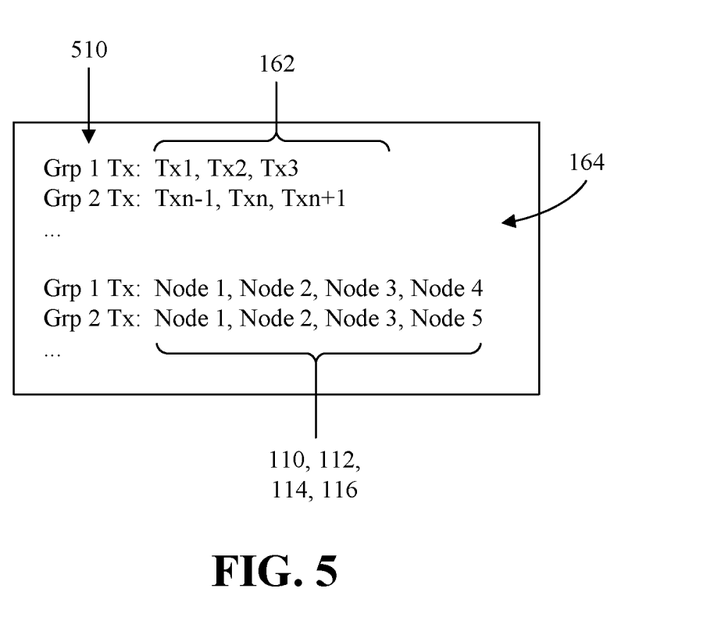
FIG. 5 is a table presenting another example of transaction storage data.

FIG. 5 is a table presenting another example of transaction storage data 164. In this example, the transaction storage data 164 can specify an assignment of each transaction 162 to at least one transaction group 510. In illustration, transactions Tx1, Tx2 and Tx3 can be assigned to a transaction group Grp 1 Tx and transactions Txn−1, Txn, Txn+1 can be assigned to a transaction group Grp 2 Tx. The transactions 162 can be grouped according to any suitable criteria. For example, transactions 162 that are related, or closely related, can be grouped together. Such transactions 162 can be identified based on their reference history and/or using machine learning to group together transactions 162 to satisfy locality requirements. For instance, if transactions 162 are referenced together, they can be assigned to the same transaction group 510 in order to minimize access time and minimize computing resources used to access the transactions 162.

The number of transactions 162 assigned to any transaction group 510 is not limited in any particular number. In one arrangement, each transaction 162 can be assigned to a single transaction group 510. In another arrangement, some transactions 162 can be assigned to a single transaction group 510, and some transactions 162 can be assigned to a plurality of transaction groups 510. For instance, certain types of transactions 162 can be assigned to a plurality of transaction groups 510. The determination of which transactions 162 are assigned to which transaction groups 510 can be made in any suitable manner, for example using one or more algorithms known in the art that are used to solve knapsack problems, which are problems in combinatorial optimization. By way of example, such algorithms can determine transactions 162 to include in transaction groups 510 given a weight and/or value assigned to each of the transactions 162. The transactions 162 to include in a particular transaction group 510 can be selected so that the total weight and/or value of the transactions 162 in the transaction group 510 is less than or equal to a threshold value, while still being as large as practical or possible.

The transaction storage data 164 also can specify an assignment of each transaction group 510 to one or more computing nodes 110, 112, 114, 116. In illustration, the transaction group Grp 1 Tx can be assigned to node 1, node 2, node 3 and node 4, and the transaction group Grp 2 Tx can be assigned to node 1, node 2, node 3 and node 5. In this example, nodes 1, 2 and 3 can are assigned each of the transaction groups 510, while node 4 only is assigned transaction group Grp 1 Tx and node 5 only is assigned transaction group Grp 2 Tx.

Referring again to FIGS. 1 and 2, at step 208 of the method 200 the computing node 110 can add the generated transaction storage data 164 to the new block 160. For example, briefly referring again to FIG. 3, the computing node 110 can store the transaction storage data 164 in the block header 340 of the new block 160. At step 210, the computing node 110 can communicate the new block 160 to a plurality of computing nodes 112-116. The computing nodes 112-116 to which the new block 160 is communicated can be computing nodes that are members of a blockchain group responsible for maintaining the blockchain 130, and of which the computing node 110 also can be a member.

Figure 6:
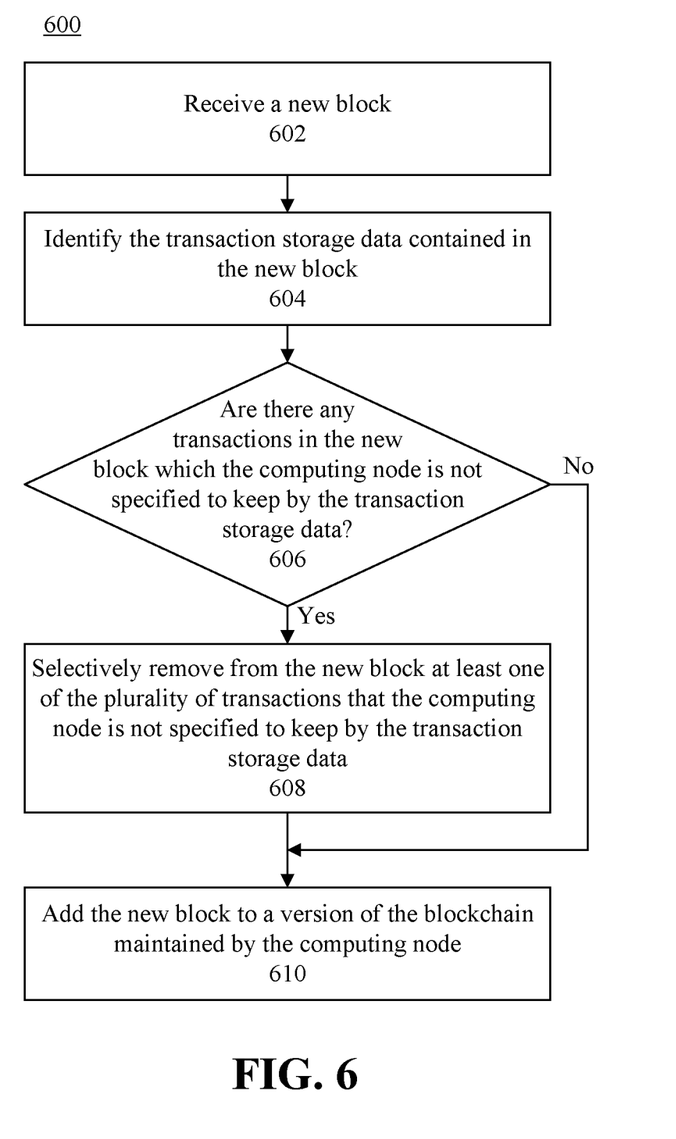
FIG. 6 is a flow chart illustrating an example of a method of selectively removing transactions from a block and adding the block to a blockchain.

FIG. 6 is a flow chart illustrating an example of a method 600 of selectively removing transactions from a block and adding the block to a blockchain. The method 600 will be described with reference to FIGS. 1 and 6. The method 600 can be implemented by the each of the computing nodes 112, 114, 116 (e.g., the blockchain applications 142, 144, 146). The method 600 also can be performed by the computing node 110 (e.g., the blockchain application 140) for new blocks the computing node 110 receives from other computing nodes 112-116. For simplicity, the method 600 will be described from the perspective of the computing node 112.

At step 602 of the method 600, the computing node 112 can receive the new block 160 from the computing node 110. At step 604, the computing node 112 can identify the transaction storage data 164 contained in the new block 160. At decision box 606, the computing node 112 can determine from the transaction storage data 164 whether there are any transactions 162 in the block 160 which the computing node 112 is not specified to keep by the transaction storage data 164. If there are any such transactions 162, at step 608, the computing node 112 can selectively remove from the new block 160 at least one of the plurality of transactions 162 that the computing node 112 is not specified to keep by the transaction storage data 164.

In illustration, referring to FIG. 3, if the transaction storage data 164 specifies that the transaction Tx3 is to be kept by the computing node 112, but does not specify any other transactions that are to be kept by the computing node 112, the computing node 112 can remove the transactions Tx0, Tx1 and Tx2 from the new block 160. In this regard, the computing node 112 can remove the transactions Tx0, Tx1 and Tx2 from the new block 160 that the computing node 112 is not specified to keep by the transaction storage data 164.

Figure 7:
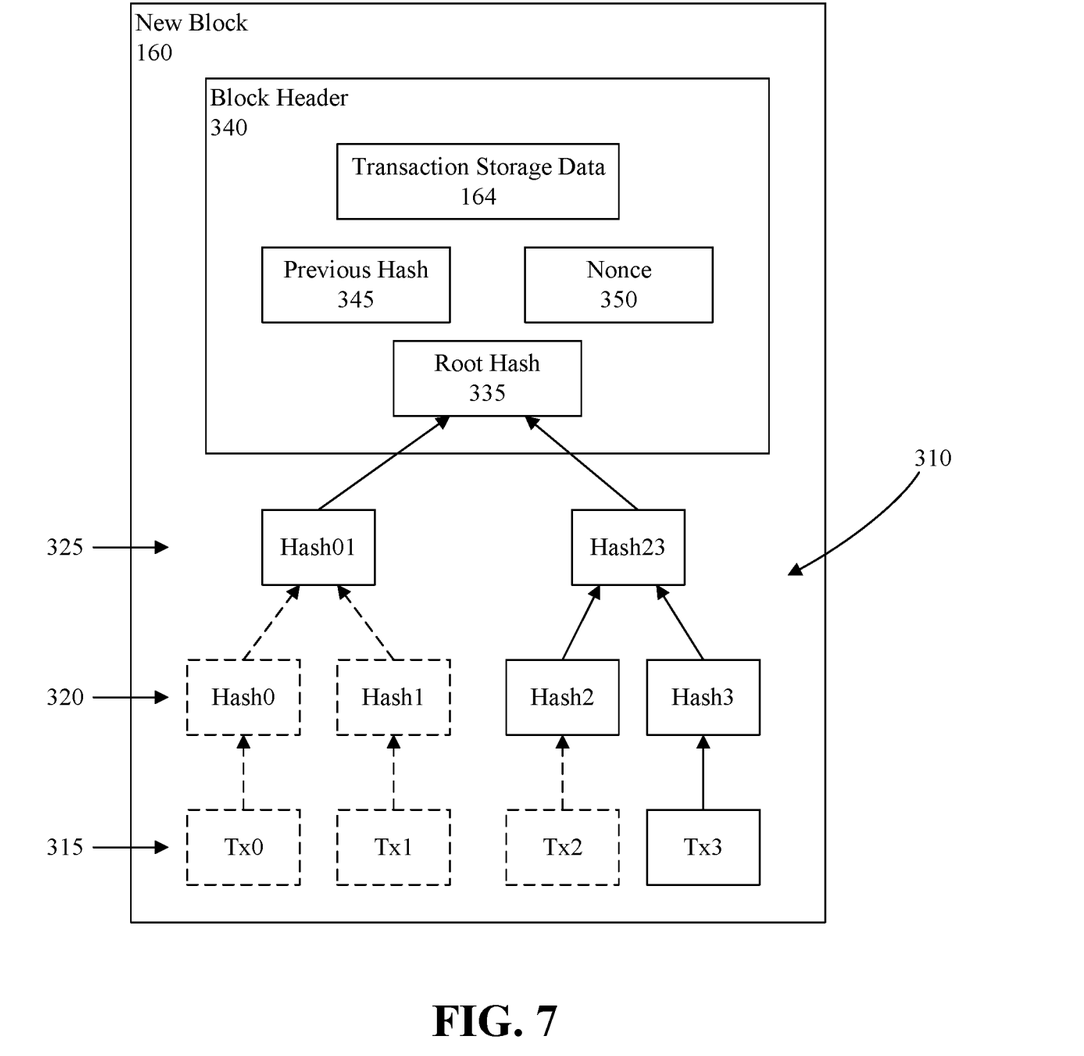
FIG. 7 is a diagram illustrating example structure for a block in which transactions are removed.

For example, referring to FIG. 7, the leaf nodes 315 for the transactions Tx0, Tx1 and Tx2 can be removed from the hash tree 310. Also, since the transactions Tx0 and Tx1 are removed from the hash tree, the non-leaf nodes 320 for the hashes Hash0 and Hash1 can be removed from the hash tree 310. Because the root hash 335 is determined based on Hash01 and Hash23, the computing node 112 can keep the non-leaf nodes 325 for those hashes in the hash tree 310. Also, because Hash23 is determined based on Hash2 and Hash3, the computing node 112 can keep the non-leaf nodes 320 for those hashes in the hash tree 310, even though the transaction Tx2, from which Hash2 is determined, has been removed.

Referring again to FIGS. 1 and 6, the method 600 can proceed from step 608 to step 610, the computing node 112 can store the new block 160 to the version 130-2 of the blockchain 130 maintained by the computing node 112. Thus, the new block 160 can be stored to the version 130-2 of the blockchain 130 without the removed transactions 162.

Referring again to decision box 606, if the computing node 112 determines there are not any transactions 162 in the block 160 which the computing node 112 is not specified to keep by the transaction storage data 164, the process can proceed to 610, and the computing node 112 can store the new block 160 to the version 130-2 of the blockchain 130 maintained by the computing node 112. Thus, the new block 160 can be stored to the version 130-2 of the blockchain 130 with all of the transactions 162.

At this point it should be noted that if a new computing node joins the blockchain group, that new computing node can receive any new blocks generated after the new computing node joined the blockchain group. In one aspect, the new computing node need only store any new blocks that are received, for example as previously described, and need not maintain pre-existing blocks in the blockchain 130. In another aspect, the new computing node can request pre-existing blocks from one or more of the computing nodes 110-116 that are members of the blockchain group, and store/maintain the pre-existing blocks in the blockchain 130.

Figure 8:
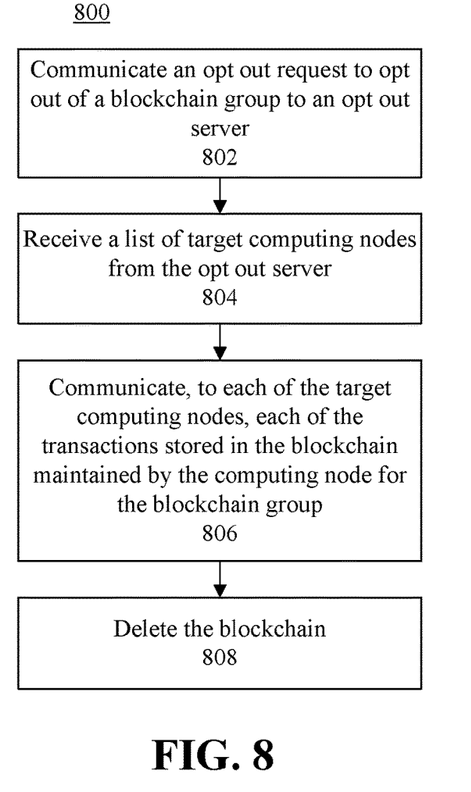
FIG. 8 is a flow chart illustrating an example of a method of opting out of a blockchain group.

FIG. 8 is a flow chart illustrating an example of a method 800 of opting out of a blockchain group, for example the blockchain group responsible for maintaining the blockchain 130. The method 600 will be described with reference to FIGS. 1 and 8. The method 800 can be implemented by the any of the computing nodes 110, 112, 114, 116 (e.g., the blockchain applications 140, 142, 144, 146) in response to users of the computing nodes 110-116 choosing to opt out of the blockchain group, or the blockchain applications 140, 142, 144, 146 automatically determining to opt out of the blockchain group. For example, a user or a blockchain application 140-146 can choose to opt out of the blockchain group responsive to determining that computing resources (e.g., storage space, memory resources, processing resources, etc.) on the computing nodes 110-116 need to be freed up. For simplicity, the method 800 will be described from the perspective of the computing node 116.

At step 802 of the method 802, the computing node 116 can communicate to the opt out server 150 an opt out request 170. The opt out server 150 can process the opt out request 170, as will be described with reference to FIG. 9. At step 804 the computing node 116 can receive from the opt out server 150 a list of target computing nodes (hereinafter "list") 175. The list 175 can indicate as the target computing nodes one or more other computing nodes 110-114 that are members of the blockchain group for which the computing node 116 is opting out. At step 806, the computing node 116 can communicate, to each of the target computing nodes, each of the transactions 162 stored in the computing node's local version of the blockchain 130 (i.e., blockchain 130-$n$) maintained by the computing node 116 for the blockchain group. At step 808, the computing node 116 can delete the blockchain 130-$n$. In an arrangement, the computing node 116 can wait to delete the blockchain 130-$n$ until after one or more of the target computing nodes has sent a response to the computing node 116 indicating that each of the transactions stored in the blockchain 130-$n$ have been received. In a case in which a size of the blockchain 130-$n$ exceeds a threshold value, the computing node 116 can communicate the transactions 162 in a plurality of groups, and wait until confirmation a particular group of transactions has been received by one or more of the target computing nodes before sending a next group.

Figure 9:
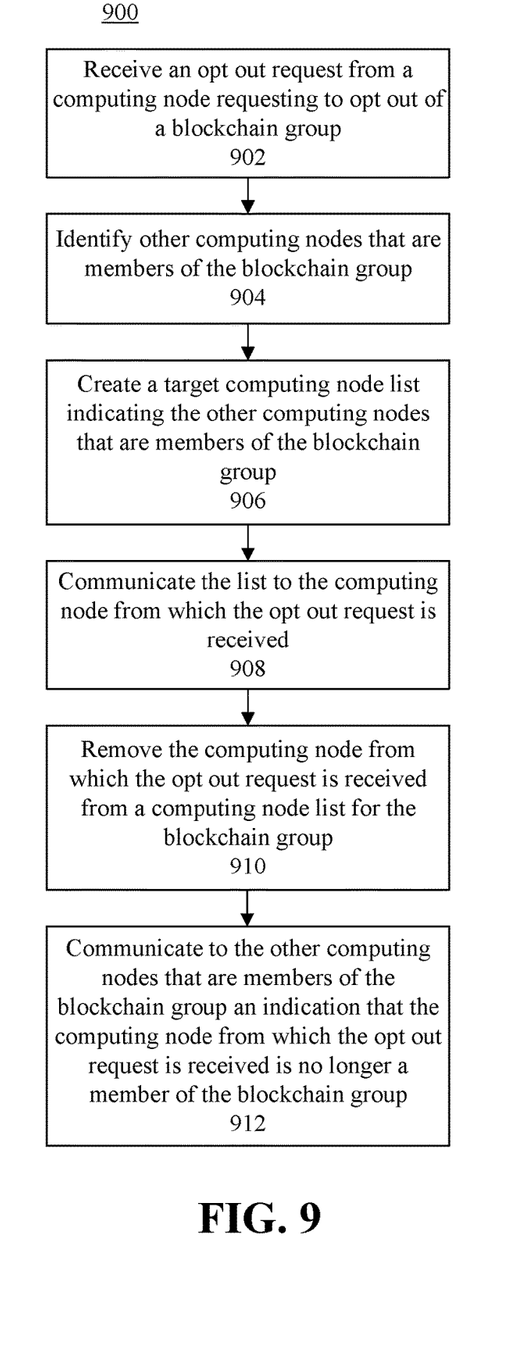
FIG. 9 is a flow chart illustrating an example of a method processing a request to opt out of a blockchain group.

FIG. 9 is a flow chart illustrating an example of a method 900 processing a request to opt out of a blockchain group. The method 900 will be described with reference to FIGS. 1 and 9. The method 900 can be implemented by the opt out server 150, for example an opt out server application 180 hosted (i.e., executed) by the opt out server 150.

At step 902 of the method 900, the opt out server 150 can receive an opt out request from the computing node 116 requesting to opt out of the blockchain group. At step 904, the opt out server 150 can identify other computing nodes 110-114 that are members of the blockchain group. For example, the opt out server 150 can access a computing node list 185 indicating the computing nodes 110-116 that are members of the blockchain group, and identify in the computing node list 185 each of the computing nodes 110-114 that are not the computing node 116 requesting to opt out of the blockchain group. The computing node list 185 can be contained in a data table (e.g., a database table) or other suitable functional data structure. The opt out server 150 can store the computing node list 185 locally or on one or more remote storage devices/systems to which the opt out server 150 is communicatively linked.

At step 906, the opt out server 150 can create the list of target computing nodes (hereinafter "list") 175 indicating the other computing nodes 110-114 that are members of the blockchain group. At step 908, the opt out server 150 can communicate the list 175 to the computing node 116.

At step 910, the opt out server 150 can remove the computing node 116 from which the opt out request 170 is received from the computing node list 185 for the blockchain group. At step 912, the opt out server 150 can communicate to the other computing nodes 110-114 that are members of the blockchain group an indication that the computing node 116 from which the opt out request 170 is received is no longer a member of the blockchain group. In one aspect, the indication can simply instruct the computing nodes 110-114 to remove the computing node 116 from respective computing node lists maintained by the computing nodes 110-114. In another arrangement, the opt out server 150 can communicate the list 175 to the computing nodes 110-114, which can serve to as the indication. For example, the computing nodes 110-114 can replace their respective computing node lists with the list 175. Regardless of how the indication is communicated to the computing nodes 110-114, the computing nodes 110-114 can access their respective computing nodes lists, which have been updated or replaced to remove the computing node 116, when generating new blocks and, in the transaction storage data 164, only specify computing nodes 110-114 that are indicated in the lists. Further, when a new computing node joins the blockchain group, the respective lists can be updated in a suitable manner to indicate the new computing node, and the new computing node can receive new blocks which are created.

Figure 10:
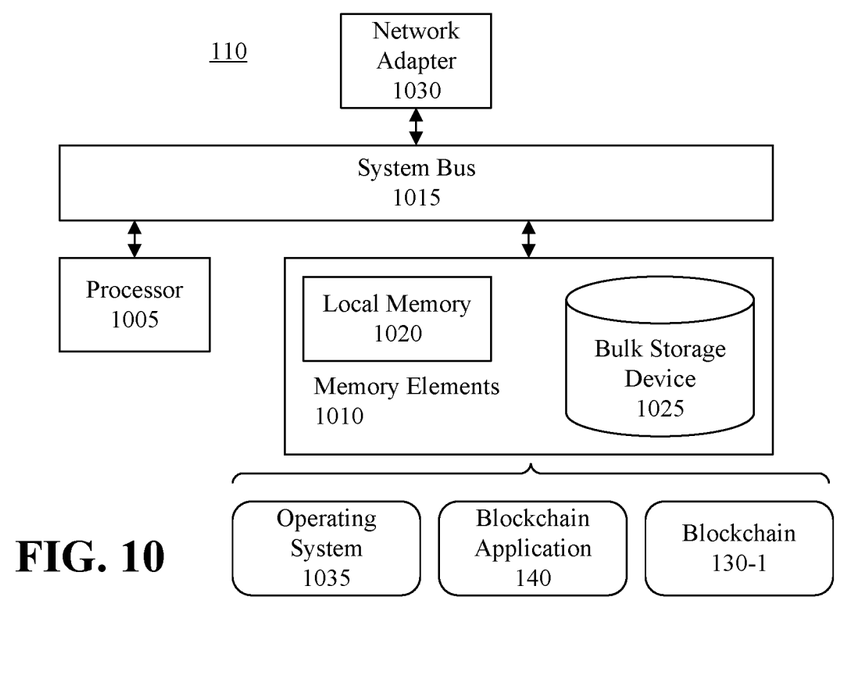
FIG. 10 is a block diagram illustrating example architecture for a computing node.

FIG. 10 is a block diagram illustrating example architecture for the computing node 110. The computing nodes 112-116 can include a similar architecture. The computing node 110 can include at least one processor 1005 (e.g., a central processing unit) coupled to memory elements 1010 through a system bus 1015 or other suitable circuitry. As such, the computing node 110 can store program code within the memory elements 1010. The processor 1005 can execute the program code accessed from the memory elements 1010 via the system bus 1015. It should be appreciated that the computing node 110 can be implemented in the form of any system including a processor and memory that is capable of performing the functions and/or operations described within this specification as being performed by the computing node 110 or the computing nodes 112-116. For example, the computing node 110 can be implemented as a workstation, a desktop computer, a mobile computer, a tablet computer, a laptop computer, a netbook computer, a smart phone, a network appliance, an application specific computing device, and so on.

The memory elements 1010 can include one or more physical memory devices such as, for example, local memory 1020 and one or more bulk storage devices 1025. Local memory 1020 refers to random access memory (RAM) or other non-persistent memory device(s) generally used during actual execution of the program code. The bulk storage device(s) 1025 can be implemented as a hard disk drive (HDD), solid state drive (SSD), or other persistent data storage device. The computing node 110 also can include one or more cache memories (not shown) that provide temporary storage of at least some program code in order to reduce the number of times program code must be retrieved from the bulk storage device 1025 during execution.

At least one network adapter 1030 can be coupled to computing node 110 to enable the computing node 110 to become coupled to other computing nodes, systems, computer systems, remote printers, and/or remote storage devices through intervening private or public networks. Modems, cable modems, transceivers, and Ethernet cards are examples of different types of network adapters 1030 that can be used with the computing node 110. Optionally, input/output (I/O) devices, for example a display, a pointing device, a keyboard, etc. can be coupled to the computing node 110. The I/O devices can be coupled to the computing node 110 either directly or through intervening I/O controllers.

As pictured in FIG. 10, the memory elements 1010 can store the components of the computing node 110, namely an operating system 1035, the blockchain application 140 and the blockchain 130-1. Being implemented in the form of executable program code, the operating system 1035 and the blockchain application 140 can be executed by the computing node 110 and, as such, can be considered part of the computing node 110. Further, the operating system 1035, the blockchain application 140 and the blockchain 130-1 are functional data structures that impart functionality when employed as part of the computing node 110.

Figure 11:
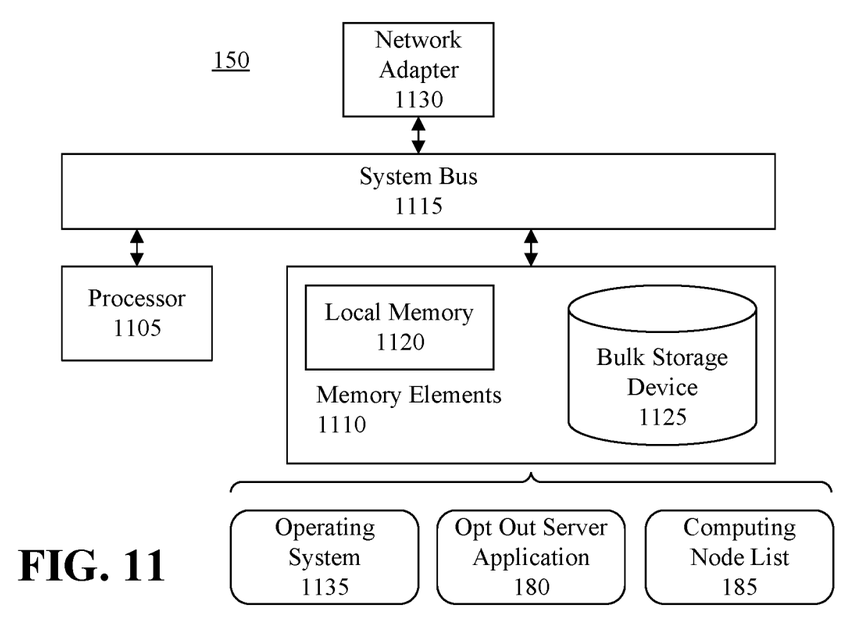
FIG. 11 is a block diagram illustrating example architecture for an opt out server.

FIG. 11 is a block diagram illustrating example architecture for the opt out server 150. The opt out server 150 can include at least one processor 1105 (e.g., a central processing unit) coupled to memory elements 1110 through a system bus 1115 or other suitable circuitry. As such, the opt out server 150 can store program code within the memory elements 1110. The processor 1105 can execute the program code accessed from the memory elements 1110 via the system bus 1115. It should be appreciated that the opt out server 150 can be implemented in the form of any system including a processor and memory that is capable of performing the functions and/or operations described within this specification as being performed by the opt out server 150. For example, the opt out server 150 can be implemented as a data processing system, a plurality of data processing systems that are communicatively linked, and so on.

The memory elements 1110 can include one or more physical memory devices such as, for example, local memory 1120 and one or more bulk storage devices 1125. The opt out server 150 also can include one or more cache memories (not shown) that provide temporary storage of at least some program code in order to reduce the number of times program code must be retrieved from the bulk storage device 1125 during execution.

At least one network adapter 1130 can be coupled to opt out server 150 to enable the opt out server 150 to become coupled to computing nodes, systems, computer systems, remote printers, and/or remote storage devices through intervening private or public networks. Modems, cable modems, transceivers, and Ethernet cards are examples of different types of network adapters 1130 that can be used with the opt out server 150.

As pictured in FIG. 11, the memory elements 1110 can store the components of the opt out server 150, namely an operating system 1135 and the opt out server application 180. Being implemented in the form of executable program code, these components of the opt out server 150 can be executed by the opt out server 150 and, as such, can be considered part of the opt out server 150. The memory elements also can store, at least temporarily, the computing node list 185. The operating system 1135, opt out server application 180 and computing node list 185 are functional data structures that impart functionality when employed as part of the opt out server 150.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   initiating creation of a new block for a blockchain, the new block comprising a plurality of transactions, the blockchain comprising a plurality of existing blocks;
   generating, using a processor, transaction storage data for the new block, the transaction storage data indicating the plurality of transactions and specifying, for each of the plurality of transactions, which of a plurality of computing nodes are to keep the transaction in the new block, wherein the transaction storage data for the new block specifies that at least a first computing node of the plurality of computing nodes is to keep at least a first transaction of the plurality of transactions but does not specify that at least a second computing node of the plurality of computing nodes is to keep the first transaction, and the transaction storage data for the new block specifies that the second computing node is to keep at least a second transaction of the plurality of transactions;
   adding the generated transaction storage data to the new block; and
   communicating the new block to the plurality of computing nodes, wherein, responsive to the transaction storage data contained in the new block specifying that at least the first computing node is to keep the first transaction but not specifying that at least the second computing node is to keep the first transaction:
      the first computing node keeps the first transaction in a version of the new block maintained by the first computing node; and
      the second computing node selectively removes the first transaction from a version of the new block maintained by the second computing node while keeping in the version of the new block maintained by the second computing node transactions that the second computing node is specified to keep.

2. The method of claim 1, wherein adding the generated transaction storage data to the new block comprises adding the generated transaction storage data to a header of the new block.

3. The method of claim 1, wherein the transaction storage data specifies that at least one of the plurality of computing nodes is to keep each of the plurality of transactions.

4. The method of claim 1, wherein the plurality of computing nodes specified by the transaction storage data includes only computing nodes that are current members of a blockchain group to which the blockchain is assigned.

5. The method of claim 1, further comprising:
   communicating an opt out request to opt out of a blockchain group to an opt out server;
   receiving a list of target computing nodes from the opt out server; and
   communicating, to each of the target computing nodes, each of the transactions stored in a local version of the blockchain.

6. The method of claim 1, further comprising:
   receiving, by the first computing node of the plurality of computing nodes, the new block created for the blockchain;
   identifying the transaction storage data, contained in the new block, specifying a portion of the plurality of transactions the first computing node is to keep;

selectively removing, by the first computing node, from the new block at least one of the plurality of transactions that the first computing node is not specified to keep by the transaction storage data, while keeping in the new block the portion of the plurality of transactions specified, by the transaction storage data contained in the new block, for the first computing node to keep; and adding the new block to a version of the blockchain maintained by the first computing node.

7. The method of claim 6, wherein selectively removing, by the first computing node, from the new block the at least one of the plurality of transactions that the first computing node is not specified to keep by the transaction storage data comprises:

removing, by the first computing node, from the new block each of the plurality of transactions that the first computing node is not specified by the transaction storage data to keep.

8. A system, comprising:

a processor programmed to initiate executable operations comprising:

initiating creation of a new block for a blockchain, the new block comprising a plurality of transactions, the blockchain comprising a plurality of existing blocks;

generating transaction storage data for the new block, the transaction storage data indicating the plurality of transactions and specifying, for each of the plurality of transactions, which of a plurality of computing nodes are to keep the transaction in the new block, wherein the transaction storage data for the new block specifies that at least a first computing node of the plurality of computing nodes is to keep at least a first transaction of the plurality of transactions but does not specify that at least a second computing node of the plurality of computing nodes is to keep the first transaction, and the transaction storage data for the new block specifies that the second computing node is to keep at least a second transaction of the plurality of transactions;

adding the generated transaction storage data to the new block; and communicating the new block to the plurality of computing nodes, wherein, responsive to the transaction storage data contained in the new block specifying that at least the first computing node is to keep the first transaction but not specifying that at least the second computing node is to keep the first transaction:

the first computing node keeps the first transaction in a version of the new block maintained by the first computing node; and the second computing node selectively removes the first transaction from a version of the new block maintained by the second computing node while keeping in the version of the new block maintained by the second computing node transactions that the second computing node is specified to keep.

9. The system of claim 8, wherein adding the generated transaction storage data to the new block comprises adding the generated transaction storage data to a header of the new block.

10. The system of claim 8, wherein the transaction storage data specifies that at least one of the plurality of computing nodes is to keep each of the plurality of transactions.

11. The system of claim 8, wherein the plurality of computing nodes specified by the transaction storage data includes only computing nodes that are current members of a blockchain group to which the blockchain is assigned.

12. The system of claim 8, the executable operations further comprising:

communicating an opt out request to opt out of a blockchain group to an opt out server;

receiving a list of target computing nodes from the opt out server; and communicating, to each of the target computing nodes, each of the transactions stored in a local version of the blockchain.

13. The system of claim 8, the executable operations further comprising:

receiving, by the first computing node of the plurality of computing nodes, the new block comprising a plurality of transactions, the blockchain comprising a plurality of existing blocks;

identifying the transaction storage data, contained in the new block, specifying a portion of the plurality of transactions the first computing node is to keep;

selectively removing, by the first computing node, from the new block at least one of the plurality of transactions that the first computing node is not specified to keep by the transaction storage data, while keeping in the new block the portion of the plurality of transactions specified, by the transaction storage data contained in the new block, for the first computing node to keep; and adding the new block to a version of the blockchain maintained by the first computing node.

14. The system of claim 13, wherein selectively removing, by the first computing node, from the new block the at least one of the plurality of transactions that the first computing node is not specified to keep by the transaction storage data comprises:

removing, by the first computing node, from the new block each of the plurality of transactions that the first computing node is not specified by the transaction storage data to keep.

15. A computer program product comprising a computer readable storage medium having program code stored thereon, the program code executable by a processor to perform a method comprising:

initiating, by the processor, creation of a new block for a blockchain, the blockchain comprising a plurality of existing blocks, the new block comprising a plurality of transactions;

generating, by the processor, transaction storage data for the new block, the transaction storage data indicating the plurality of transactions and specifying, for each of the plurality of transactions, which of a plurality of computing nodes are to keep the transaction in the new block, wherein the transaction storage data for the new block specifies that at least a first computing node of the plurality of computing nodes is to keep at least a first transaction of the plurality of transactions but does not specify that at least a second computing node of the plurality of computing nodes is to keep the first transaction, and the transaction storage data for the new block specifies that the second computing node is to keep at least a second transaction of the plurality of transactions;

adding, by the processor, the generated transaction storage data to the new block; and communicating, by the processor, the new block to the plurality of computing nodes, wherein, responsive to the transaction storage data contained in the new block specifying that at least the first computing node is to keep the first transaction but not specifying that at least the second computing node is to keep the first transaction:

the first computing node keeps the first transaction in a version of the new block maintained by the first computing node; and the second computing node selectively removes the first transaction from a version of the new block maintained by the second computing node while keeping in the version of the new block maintained by the second computing node transactions that the second computing node is specified to keep.

16. The computer program product of claim 15, wherein adding the generated transaction storage data to the new block comprises adding the generated transaction storage data to a header of the new block.

17. The computer program product of claim 15, wherein the transaction storage data specifies that at least one of the plurality of computing nodes is to keep each of the plurality of transactions.

18. The computer program product of claim 15, wherein the plurality of computing nodes specified by the transaction storage data includes only computing nodes that are current members of a blockchain group to which the blockchain is assigned.

19. The computer program product of claim 15, the method further comprising:

communicating an opt out request to opt out of a blockchain group to an opt out server;

receiving a list of target computing nodes from the opt out server; and communicating, to each of the target computing nodes, each of the transactions stored in a local version of the blockchain.

20. The computer program product of claim 15, the method further comprising:

receiving, by the first computing node of the plurality of computing nodes, the new block created for the blockchain;

identifying the transaction storage data, contained in the new block, specifying a portion of the plurality of transactions the first computing node is to keep;

selectively removing, by the first computing node, from the new block at least one of the plurality of transactions that the first computing node is not specified to keep by the transaction storage data, while keeping in the new block the portion of the plurality of transactions specified, by the transaction storage data contained in the new block, for the first computing node to keep; and adding the new block to a version of the blockchain maintained by the first computing node.

\* \* \* \* \*